United States Patent [19]

Wagner

[11] 4,186,107

[45] Jan. 29, 1980

[54] SOLID CATALYST COMPONENT FOR OLEFIN POLYMERIZATION

[75] Inventor: Kalus P. Wagner, Newark, Del.

[73] Assignee: Hercules Incorporated, Wilmington, Del.

[21] Appl. No.: 896,279

[22] Filed: Apr. 14, 1978

[51] Int. Cl.² .......................... C08F 4/02; C08F 4/64
[52] U.S. Cl. ............................. 252/429 B; 252/429 C; 526/125
[58] Field of Search ............ 252/429 R, 429 B, 429 C

[56] References Cited

U.S. PATENT DOCUMENTS

| | | | |
|---|---|---|---|
| 3,642,746 | 2/1972 | Kashiwa et al. | 252/429 B X |
| 3,953,414 | 4/1976 | Galli et al. | 252/429 B X |

FOREIGN PATENT DOCUMENTS 849503 4/1977 Belgium .
1373981 11/1974 United Kingdom .

*Primary Examiner*—Patrick Garvin
*Attorney, Agent, or Firm*—John W. Whitson

[57] ABSTRACT

The transition metal component of a Ziegler-Natta catalyst is composed of a titanium halide deposited on a magnesium halide support. The support is prepared by a process involving reaction of a dialkyl magnesium with an alkyl aluminum halide in a hydrocarbon solvent and including treatment of the magnesium halide formed in the reaction with an electron donor, preferably a dialkyl ether.

10 Claims, No Drawings

SOLID CATALYST COMPONENT FOR OLEFIN POLYMERIZATION

This invention relates to a 1-olefin polymerization catalyst component composed of a titanium halide deposited on a magnesium halide support. More particularly, it relates to a process for preparing an improved magnesium halide support consisting essentially of the magnesium halide, which support, upon treatment with a titanium halide, provides a superior catalyst component for use in the polymerization of 1-olefins.

As is well known in the art, effective catalysts for the polymerization of 1-olefins are the Ziegler-Natta catalysts obtained by combining transition metal compounds of Groups IVb to VIb of the periodic table with organometallic compounds of Groups I to III of the table. It also is known that these catalysts can be made even more effective by depositing the transition metal component on an inorganic compound as a support.

Representative of the supports shown in the art are the magnesium and titanium oxides, aluminum silicate, magnesium carbonate, magnesium chloride, magnesium hydroxides and alkoxides, and complex oxides of magnesium and aluminum. These solid supports usually require activation either prior to or following deposition of the transition metal compound on the support, activation generally being accomplished by ball milling or by calcination. As a consequence, it is difficult to control the particle size of the solid support and to obtain sufficient catalytic activity and mileage from the transition metal compound that the catalyst need not be removed from the polyolefin product.

Further known to art is the utilization of dialkyl magnesium compounds and alkyl aluminum halides in the preparation of 1-olefin polymerization catalysts. For example, it is known to effect reaction between diethyl aluminum chloride and di-n-butyl magnesium in hydrocarbon solution whereby a precipitate of magnesium chloride is formed. However, to the resulting reaction mixture there then is added a molar excess, based on the magnesium chloride, of a titanium halide such as titanium tetrachloride and the final reaction mixture, in which all of the titanium tetrachloride has been reduced to titanium trichloride, is used as such in the polymerization of an olefin such as ethylene or propylene. There is no separation of the intermediately precipitated magnesium chloride particles and obviously no subsequent treatment of the separated particles.

Now in accordance with this invention, it has been found that an improved support for the transition metal compound of a Ziegler-Natta catalyst can be prepared by contacting a hydrocarbon solution of a dialkyl magnesium with a hydrocarbon solution of an alkyl aluminum halide at a temperature of from about $-65°$ C. to about 30° C., thereby forming a suspension in the hydrocarbon of a magnesium halide having a particle size ranging from about 0.05 to about 80 microns, isolating the magnesium halide particles, successively washing these particles with fresh hydrocarbon until the particles are substantially free of halide and residual aluminum compounds and contacting said particles with an electron donor either before or after said particles are successively washed with the hydrocarbon. Under certain circumstances, this last step of the preparation may be omitted, if desired. As an example of this process, n-butyl sec-butyl magnesium is dissolved in an aliphatic hydrocarbon such as hexane and the resulting solution is brought into contact with a solution of ethyl aluminum dichloride in hexane at a temperature of $-65°$ C. After a reaction period of approximately two hours, the resulting finely-divided white slurry of magnesium chloride is centrifuged, the solvent decanted and the magnesium chloride particles resuspended several times in hexane. The washed particles, resuspended in hexane, then are treated with a controlled amount of isoamyl ether, for example, for about an hour at a temperature of about 20° C. The particles again are washed several times with hexane, and the washed particles finally are suspended in fresh hexane for utilization in preparation of the transition metal component of the 1-olefin polymerization catalyst.

Now, having generally outlined the embodiments of this invention, the following examples constitute specific illustrations. All amounts are as given in the examples, and all operations were carried out in an inert atmosphere.

EXAMPLE 1

Support Preparation

A 500 ml. three-necked flask was equipped with an agitator, a Y-tube carrying a reflux condenser and thermometer, and a second Y-tube carrying an addition funnel and a rubber septum. All components of the apparatus were dried and purged with argon. An argon atmosphere was provided throughout the reaction. The flask was charged with 200 ml. of a 0.48 molar solution of dibutyl magnesium (97 millimoles) in a 50:50 by volume admixture of hexane and heptane. The dibutyl magnesium was n-butyl sec-butyl magnesium. This solution was diluted with 50 ml. of hexane and the resulting solution was cooled to $-65°$ C. using an acetone, dry ice bath. To the solution then was added 70 ml. of a hexane solution of ethyl aluminum dichloride (289 millimoles) through the addition funnel. The addition was carried out dropwise over a period of two hours while stirring the reaction mixture at 300 r.p.m. The aluminum to magnesium mole ratio in the reaction mixture was 3:1. The resulting finely-divided white slurry of magnesium chloride was washed free of unadsorbed aluminum compounds by centrifuging, decanting and resuspending the slurry four times using 40 ml. portions of hexane. After the final wash, the supernatant liquid contained less than 0.2 g. of free chloride per liter, indicating that the magnesium chloride particles formed in the reaction had been essentially washed free of residual aluminum compounds, and the solid particles were resuspended in hexane to provide a slurry having a total volume of 250 ml. To 25 ml. of this hexane slurry of magnesium chloride (8.8 millimoles of magnesium, 1.85 millimoles of aluminum) was added diisoamyl ether (8.0 millimoles) and the resulting admixture was maintained for one hour at room temperature. The white slurry then was centrifuged, the solvent decanted and the resulting solid washed three times using 50 ml. of hexane each time. The magnesium chloride particles so obtained contained less than one-half the amount of aluminum present in the particles prior to the ether treatment.

Catalyst Preparation

After resuspending the ether-treated particles from the above preparation to 35 ml. in hexane, the resulting slurry was stirred with ethyl benzoate (0.24 millimole) for one hour at room temperature. To the slurry then was added titanium tetrachloride (0.48 millimole) and the reaction mixture was stirred for one hour at 35° C.

The resulting slurry was treated with diisoamyl ether (8.0 millimoles) for one hour at 35° C. and then was centrifuged, the solvent decanted and the solid washed three times using 50 ml. of hexane each time. At this point, the magnesium chloride particles contained only 0.48 millimole of aluminum. The now pale yellow slurry was resuspended to 60 ml. with hexane. The amount of titanium on the support, based on magnesium, was 3.49 mole percent, and the titanium was predominantly in the tetravalent state.

Polymerization of Propylene

An 800 ml. glass polymerization vessel was charged with 400 ml. of hexane and, after sparging the vessel with argon, the hexane was warmed to 60° C. and sequentially treated with 0.32 millimole of triethyl aluminum and 0.1 millimole of ethyl benzoate. After a holding period of 10 minutes, 2 ml. of the catalyst, as prepared above, was added to the polymerization vessel and the system was flushed with propylene until the argon had been removed. The total pressure then was adjusted to 37 p.s.i.g. and the temperature then was raised to 65° C. during the next 5 minutes. Propylene was continuously added to the reaction mixture for three hours to maintain the pressure at 37 p.s.i.g. (2.63 atmospheres partial pressure of propylene), after which the addition of propylene was discontinued and the system was reacted down for 15 minutes. The white powdery polypropylene product was filtered while hot and washed once with 150 ml. of fresh hexane which was at room temperature. The washed product, after being dried, weighed 18.8 g. An additional 0.9 g. of product was recovered from the hexane used in the polymerizatiion and in the wash. Based on these results, it was determined that the polypropylene product was obtained at an average rate of 434 g. of diluent insoluble polypropylene per millimole of titanium per atmosphere of propylene per hour. The mileage was 3421 g. of diluent insoluble polypropylene per millimole of titanium. The polymer product contained 95.2% of diluent insoluble polymer and the latter contained 8.6% of decahydronaphthalene solubles as determined by recrystallization of the diluent insoluble polymer from decahydronaphthalene. The polymer product had a bulk density of 0.20 g./cc.

EXAMPLE 2

The support and catalyst were prepared as in Example 1 and, also as in Example 1, the polymerization of propylene was carried out in an 800 ml. glass polymerization vessel charged with 400 ml. of hexane. After sparging with argon, the hexane was purged with propylene at room temperature and atmospheric pressure. The total pressure was then adjusted to 1-5 p.s.i.g. with propylene, and the activator and catalyst were added as in Example 1. Sufficient propylene was fed to the reaction mixture during the next 10 minutes so as to form 1.5 to 2.0 g. of polymer per millimole of magnesium present. After this prepolymerization stage, propylene addition was discontinued and the temperature of the reaction mixture was raised to 60° C. The total pressure in the polymerization vessel was then adjusted to 37 p.s.i.g. with propylene and the temperature of the reaction mixture raised to 65° C. Propylene addition then was renewed and, after three hours of polymerization, the product was filtered and washed as in Example 1. As defined in Example 1, the rate was 759, the mileage was 5988, the diluent insolubles was 95.7%, the decahydronaphthalene solubles was 7.6% and the bulk density of the product was 0.42.

EXAMPLE 3

Support Preparation

A 500 ml. four-necked flask, equipped with an agitator, a condenser, a thermometer and an addition funnel was charged with 60 millimoles of 0.57 molar n-butyl sec-butyl magnesium in hexane, heptane, and this solution was further diluted with 30 ml. of cyclohexane, stirred at 300 r.p.m. for 30 minutes at 22° C. and cooled to −65° C. using an acetone, dry ice bath. Fifty-one milliliters of a heptane solution of ethyl aluminum dichloride (180 millimoles) was charged to the addition funnel and added dropwise to the dibutyl magnesium solution over two hours while stirring at 300 r.p.m. The fine, white slurry was stirred for an additional hour at −65° C., warmed to room temperature and stirred for a further hour. The slurry then was washed free of uncombined aluminum compounds, as described in Example 1, and resuspended in hexane to a total volume of 150 ml. The support particle size ranged from 0.05 micron to 80 microns, but the majority of the particles were between 2 and 7 microns in size. A portion of this support slurry (25 ml., 9.3 millimoles of magnesium) was treated with diisoamyl ether and washed, as described in Example 1.

Catalyst Preparation

The catalyst was prepared as in Example 1. The amount of titanium on the support, based on magnesium, was 1.55 mole percent.

Polymerization of Propylene

The polymerization of propylene was carried out as given in Example 2. As defined in Example 1, the rate was 760, the mileage was 6000, the diluent insolubles was 95.5%, the decahydronaphthalene solubles was 7.4%, and the bulk density of the product was 0.35. The particle size distribution of the product was:

| Mesh Size | On 20 | 40 | 60 | 80 | 100 | 200 | <200 |
|---|---|---|---|---|---|---|---|
| Weight % | | 0.4 | 8.8 | 9.9 | 6.2 | 6.2 | 18.7 | 49.8 |

EXAMPLE 4

Support Preparation

The apparatus described in Example 3 was used, and the flask was charged with 60 millimoles of 0.57 molar n-butyl sec-butyl magnesium in hexane, heptane, 30 ml. of cyclohexane and 6.1 ml. (30 millimoles) of diisoamyl ether. The mixture was stirred at room temperature for 15 minutes, cooled to −65° C. and treated with ethyl aluminum dichloride solution as in Example 3. After the precipitated support had been stirred the final one hour at room temperature, it settled well and could be washed free of unadsorbed aluminum compounds by decantation, this being in contrast to Examples 1-3, wherein centrifuging was required. After washing, the supernatant liquid contained less than 0.2 g. of free chloride per liter and the solid was resuspended in hexane to a total volume of 250 ml. The support particle size ranged from 0.05 micron to 80 microns, but the majority of the particles were three-dimensional agglomerates between 10 and 50 microns in size. All of this support slurry was stirred at 300 r.p.m. with 9.6 ml. of diisoamyl ether for one hour at room temperature and then washed with four 100-ml. portions of hexane by decantation.

Catalyst Preparation

The washed solid was resuspended in 150 ml. total volume with hexane and stirred with 1.44 millimoles of ethyl benzoate for one hour at room temperature. The slurry was then further treated with 2.88 millimoles of titanium tetrachloride for one hour at 35° C., and subsequently treated with 9.6 ml. of diisoamyl ether for one hour at 35° C. The now yellow solid settled well, was washed by decantation, as in the support preparation, and resuspended to a total volume of 360 ml. with fresh hexane. The amount of titanium on the support, based on magnesium, was 3.43 mole percent.

Polymerization of Propylene

The polymerization of propylene was carried out as in Example 2. As defined in Example 1, the rate was 607, the mileage was 4790, the diluent insolubles was 94.5%, the decahydronaphthalene solubles was 10.6%, and the bulk density of the product was 0.36. The particle size distribution of the product was:

| Mesh Size | On 20 | 40 | 60 | 80 | 100 | 200 | <200 |
|---|---|---|---|---|---|---|---|
| Weight % | 18.4 | 32.1 | 36.7 | 7.2 | 1.7 | 2.8 | 1.2 |

Comparison of the particle size distribution of Example 3 with that of the present example shows a reduction in fine particles <200 mesh by adding ether before precipitation of the support.

EXAMPLE 5

Support Preparation

The support was prepared as in Example 4 except that 30 millimoles of calcium hydroxide also was added to the solution containing the dialkyl magnesium and the mixture was stirred at room temperature for 30 minutes before cooling to −65° C. and beginning the precipitation with the ethyl aluminum dichloride. After washing by decantation, the particulate support was resuspended to 150 ml. total volume with fresh hexane. The entire support slurry was treated with 9.6 ml. of diisoamyl ether for one hour at room temperature and then washed as in Example 4.

Catalyst Preparation

The catalyst was prepared as shown in Example 4. The amount of titanium on the support, based on magnesium, was 1.98 mole percent.

Polymerization of Propylene

The polymerization of propylene was carried out as described in Example 2. As defined in Example 1, the rate was 506, the mileage was 3992, the diluent insolubles was 96.2%, the decahydronaphthalene solubles was 9.1% and the bulk density of the product was 0.36. The particle size distribution of the product was:

| Mesh Size | On 20 | 40 | 60 | 80 | 100 | 200 | <200 |
|---|---|---|---|---|---|---|---|
| Weight % | 20.6 | 52.4 | 17.4 | 3.5 | 1.4 | 2.9 | 1.8 |

EXAMPLE 6 (CONTROL)

Support Preparation

The support was prepared as in Example 1 by treating a hydrocarbon solution of 97 millimoles of the dialkyl magnesium dropwise with 249 millimoles of 3.55 molar ethyl aluminum dichloride over a period of two hours at −60° C. while stirring at 300 r.p.m. After washing, the supernatant liquid contained less than 0.2 g. of free chloride per liter, and the solid was resuspended to a total volume of 280 ml. in hexane. The ether treatment of Example 1 was omitted, and the aluminum concentration of the slurry was 0.065 molar.

Catalyst Preparation and Polymerization of Propylene

The catalyst was prepared as shown in Example 1 except that no ether was added during the preparation. The amount of titanium on the support, based on magnesium, was 4.60 mole percent. Polymerization of propylene was carried out as in Example 1 and, as defined therein, the rate was 145, the mileage was 1143 and the diluent insolubles was 89.1%.

EXAMPLE 7

Support Preparation

Following the procedure of Example 1, a hexane, heptane solution of 0.68 molar dibutyl magnesium (as in Example 1) (204 millimoles) was diluted with 75 ml. of hexane and cooled to −65° C. There then was added dropwise over a period of three hours 105 ml. of a heptane solution of ethyl aluminum dichloride (434 millimoles). The reaction mixture was stirred at 250 r.p.m. and the final aluminum to magnesium mole ratio was 2.13. The slurry of the finely-divided precipitate was treated with 25 ml. (123 millimoles) of diisoamyl ether, added dropwise over a 20 minute period, and further stirred for 30 minutes at room temperature. The resulting slurry was washed several times with hexane as in Example 1 and resuspended in hexane to a total volume of 375 ml. Following the procedure of Example 1, 25 ml. of the resulting slurry (8.8 millimoles of magnesium) was treated with 1.6 ml. of diisoamyl ether (8.0 millimoles), and the separated solid was washed with hexane.

Catalyst Preparation

The catalyst was prepared as in Example 1. The amount of titanium on the support, based on magnesium, was 1.35 mole percent.

Polymerization of Propylene

The polymerization was carried out as in Example 2. The aluminum to titanium mole ratio was 90. On the same basis as in Example 1, the polymerization rate was 867, the mileage was 6843, the diluent insolubles was 96.3%, the decahydronaphthalene solubles was 4.0% and the bulk density was 0.34.

EXAMPLE 8

Support Preparation

The procedure of Example 1 was followed except to use a 0.606 molar solution of butyl ethyl magnesium (100 millimoles) in the hexane, heptane solvent and 55 ml. of a heptane solution of ethyl aluminum dichloride (227 millimoles). The aluminum to magnesium mole ratio was 2.27 and the precipitated magnesium chloride product was washed free of uncombined aluminum compounds as in Example 1 and then was resuspended to 250 ml. total volume in hexane. Twenty-five ml. of the resulting slurry (7.6 millimoles of magnesium) was treated with diisoamyl ether and the solid washed, as in Example 1.

Catalyst Preparation

The catalyst was prepared following the procedure given in Example 1. The amount of titanium on the support, based on magnesium, was 3.11 mole percent.

Polymerization of Propylene

The polymerization was carried out as in Example 2. The aluminum to titanium mole ratio was 30, the rate was 867 and the mileage was 6843. The product contained 95.9% diluent insolubles and 5.6% decahydronaphthalene solubles, and the product had a bulk density of 0.36.

EXAMPLE 9 (CONTROL)

Support Preparation

A 500 ml. three-necked flask, equipped as shown in Example 1, was charged with a hexane, heptane solution (100 ml., 95 millimoles of magnesium) of a 7.5:1 mole ratio mixture of di-n-butyl magnesium and triethyl aluminum, which was further diluted with 50 ml. of heptane and cooled to $-10°$ C. using an ice, salt bath. A heptane solution of ethyl aluminum dichloride (70 ml., 237 millimoles) was charged to the addition funnel and added dropwise to the flask over two hours while stirring at 300 r.p.m. The aluminum to magnesium mole ratio was 2.5. The resulting fine white slurry was washed free of uncombined aluminum compounds as in Example 1 using three 100-ml. portions of fresh hexane and resuspended to a total volume of 250 ml. in hexane.

Catalyst Preparation

A portion of the above support slurry (54 ml., 19.2 millimoles of magnesium) was treated with 0.96 millimole of ethyl benzoate for one hour at room temperature, followed by treatment with 0.97 millimole of titanium tetrachloride for one hour at 35° C. The yellow slurry was treated with 8.0 millimoles of diisoamyl ether for one hour at 35° C. and then washed with hexane as in Example 1. The amount of titanium on the support, based on magnesium, was 2.83 mole percent.

Polymerization of Propylene

The polymerization was carried out as in Example 1 and, as defined therein, the polymerization rate was 174, the mileage was 1369, the diluent insolubles was 88.2%, the decahydronaphthalene solubles was 6.5% and the bulk density was 0.11.

EXAMPLE 10

The catalyst prepared according to Example 1 was used in the polymerization of ethylene. The reaction was carried out in a glass-lined reactor using 2 liters of hexane diluent and a total pressure of 76 p.s.i.g. The general procedure for the polymerization was that described in Example 2. The triethyl aluminum, ethyl benzoate and titanium concentrations were 1.0, 0.325 and 0.0285 millimolar, respectively. The prepolymerization was carried out at 40° C. for 10 minutes so as to form 2.0 g. of polymer per millimole of magnesium present. After polymerization for three hours at 65° C., the product was filtered and washed with 1.7 liters of fresh hexane at room temperature. The rate was 867 and the mileage was 6843. The bulk density of the product was 0.27.

The dialkyl magnesiums used in the process of this invention are those compounds having the formula $R_2Mg$ which are soluble in the hydrocarbon solvents used in the process of this invention or which can be rendered soluble in said hydrocarbon solvents through utilization of a trialkyl aluminum, $R_3Al$, in conjunction with the $R_2Mg$ compound. For example, butyl ethyl magnesium is soluble in hexane, as is n-butyl sec-butyl magnesium, but di-n-butyl magnesium is not. However, di-n-butyl magnesium becomes soluble in hexane when used in conjunction with, for example, triethyl aluminum. Usually, the amount of trialkyl aluminum needed to solubilize one mole of the otherwise hydrocarbon-insoluble dialkyl magnesium is in the range of from about 0.1 mole to about 2.0 moles. In general, the $R_2Mg$ compounds of this invention are those in which each R group may be a $C_2-C_{20}$ alkyl group provided the compounds are hydrocarbon-soluble or can be rendered so by cojoint utilization of a trialkyl aluminum solubilizing agent. The R groups in $R_3Al$ may be the same as those in the $R_2Mg$ compounds. The R groups may be, for example, ethyl, isopropyl, n-butyl, sec-butyl, t-butyl, n-amyl, isoamyl, n-hexyl, n-octyl and n-decyl, and may be the same or different. Specific $R_2Mg$ compounds already have been named, but in addition there may be mentioned the diamyl, dihexyl and dioctyl magnesiums. In addition to triethyl aluminum, specific $R_3Al$ compounds are the triisopropyl, tri-n-propyl, tri-n-butyl, triisobutyl and tri-n-hexyl aluminums.

The alkyl aluminum halides used in accordance with this invention have the formula $R'_nAlX_{3-n}$, wherein R' is a $C_2-C_{20}$ alkyl group, X is a chlorine or bromine atom and n is 1 or 2. The alkyl group may, for example, be ethyl, n-propyl, isopropyl, n-butyl, isobutyl, sec-butyl, tert-butyl, n-amyl, isoamyl, n-hexyl, n-heptyl or n-octyl. Specific compounds corresponding to the preceding formula are triethyl aluminum sesquichloride, ethyl aluminum dichloride, diethyl aluminum chloride, dibutyl aluminum chloride, butyl aluminum dichloride, dihexyl aluminum bromide and hexyl aluminum dibromide.

The hydrocarbons used as solvents in the reaction between the dialkyl magnesium and the alkyl aluminum halide may be $C_5-C_{12}$ aliphatic hydrocarbons, $C_5-C_{12}$ monocyclic cycloaliphatic hydrocarbons, $C_6-C_{12}$ monocyclic aromatic hydrocarbons or mixtures of any of these hydrocarbons. The preferred hydrocarbons are the $C_5-C_{12}$ aliphatic hydrocarbons. These same hydrocarbons also are used as the diluents in washing the isolated magnesium halide particles and in the suspensions of said particles used in the preparation of the supported titanium halide catalyst component. Representative of the aliphatic hydrocarbon solvents are pentane, hexane, heptane and octane. Representative of the cycloaliphatic hydrocarbons are cyclopentane and cyclohexane, and exemplary of the aromatic hydrocarbons are benzene, toluene and xylene.

The reaction between the dialkyl magnesium and the alkyl aluminum halide should always be carried out under an atmosphere of an inert gas such as nitrogen or argon and is conveniently carried out by adding the hydrocarbon solution of the alkyl aluminum halide to the hydrocarbon solution of the dialkyl magnesium, with the aluminum to magnesium mole ratio being from about 1:1 to about 10:1, preferably from about 2:1 to about 3:1. The reaction ordinarily is effected at a temperature in the range of from about $-65°$ C. to about 30° C., preferably from about $-65°$ C. to about 0° C. Depending upon the temperature used, the reaction time will vary from about 0.5 to about 5 hours. The precipitated magnesium halide particles may be separated from the reaction mixture by filtration or by centrifuging the reaction mixture and decanting the supernatant liquid. In some cases, the particles will readily settle from the reaction mixture and only decantation of the supernatant liquid is required to effect separation of the particles. The isolated particles are then washed a sufficient number of times with fresh hydrocarbon to substantially remove halide ion and residual aluminum compounds.

An essential step of the process of this invention, resulting in higher rates and mileages and in greater stereospecificity of the polypropylene, is that in which the magnesium halide particles are treated either during or subsequent to their precipitation with an electron donor. The electron donor may be present in the hydrocarbon solvent employed in the precipitation of the magnesium halide particles. It also may be added to the slurry of said particles after the precipitation reaction has taken place, and it may be added after one or more of the hydrocarbon washes applied to the precipitated particles. When the electron donor is present prior to the precipitation reaction, the amount used should be from about 1:10 to about 5:1, preferably from about 1:3 to about 1:1, on a molar basis relative to the amount of magnesium present. When the electron donor is added after the precipitation reaction has taken place, the amount of donor employed will be within the same ranges as those just specified. Donor treatment of the particles subsequent to their precipitation ordinarily is for a period of from about 0.25 hour to about one hour at a temperature in the range of from about 20° to about 50° C. When the electron donor is added to the solvent slurry existing after any one of the hydrocarbon washes applied to the precipitated particles, a smaller quantity of the donor is required, usually from about 3:1 to about 1:3 on a molar basis relative to the amount of magnesium present. A contact time of about one hour at room temperature is preferred. The electron donor may be added in any one or more of the above ways, but the total amount employed should not be greater than 10:1 on a molar basis relative to the amount of magnesium present.

The electron donors used in the process of this invention are ethers, esters, amines, alcohols, phenols, phosphines and sulfides. The ethers include aliphatic ethers containing four to 24 carbon atoms, such as diethyl ether, diisopropyl ether, dibutyl ether, diamyl ether, dihexyl ether and dioctyl ether, with dibutyl ether and diisoamyl ether being particularly preferred; cyclic ethers containing three or four carbon atoms such as dioxane, tetrahydrofuran and 1,3-propylene oxide; and aromatic or alkyl-aromatic ethers containing seven to 15 carbon atoms such as diphenyl ether and anisole. The esters include those alkyl esters of fatty acids wherein the esters contain a total of four to 24 carbon atoms, such as ethyl acetate, propyl acetate, butyl acetate, amyl acetate, methyl butyrate and methyl oleate; and those alkyl esters of aromatic acids wherein the esters contain a total of eight to 24 carbon atoms, such as methyl benzoate, ethyl benzoate, isoamyl benzoate, ethyl anisate, ethyl toluate and dioctyl phthalate. The amines include aliphatic primary, secondary and tertiary mono- and di-amines containing one to 12 carbon atoms, such as methylamine, diethylamine, tributylamine, methyl ethyl propyl amine, ethylene diamine and tetramethyl ethylene diamine; cyclic amines containing 4 to 6 carbons such as morpholine, pyrrolidine and piperidine; and aromatic amines containing six to 10 carbon atoms, such as aniline, pyridine and quinoline. The alcohols include aliphatic alcohols containing one to 18 carbon atoms, such as methanol, ethanol, propanol, dodecanol and octadecanol; and aromatic alcohols containing 7 to 15 carbon atoms, such as benzyl alcohol and p-methylbenzyl alcohol. The phenols include those with six to 10 carbon atoms, such as phenol, 2,6-dimethyl phenol, p-cresol and beta-naphthol. The phosphines include aliphatic trialkyl and triaromatic phosphines containing 6 to 18 carbon atoms, such as triethyl phosphine, triisobutyl phosphine, triphenyl phosphine, and ethyl diphenyl phosphine. The sulfides include the aliphatic sulfides containing 6 to 12 carbon atoms, such as dibutyl sulfide.

The preferred electron donors are the aliphatic ethers. With these compounds, it has been observed that, when the ether is added to the dialkyl magnesium before reaction with the alkyl aluminum halide, it provides a means of controlling the support morphology, in particular, the particle size distribution and the bulk density of the precipitated support. When the ether is added at any point after the precipitation, it appears to facilitate removal of residual adsorbed and occluded aluminum compounds from the magnesium halide particles, thus resulting in increased catalytic activity of the titanium compound. Further improvements provided by the ether treatment appear to be the result of coordination of the ether with the support particles and subsequently serving as an agent for fixing the titanium halide on these particles.

An alternative in the preparation of the precipitated magnesium halide particles in the process of this invention is that in which the hydrocarbon solution of the dialkyl magnesium is treated with inorganic support materials such as the oxides, hydroxides, alkoxides or hydroxyhalides of Group IIA—IIIA metals of the periodic table before reaction with the alkyl aluminum halides. The mole ratio of the dialkyl magnesium to such inorganic additives is from about 1:10 to about 50:1, preferably from about 1:1 to about 10:1. Representative examples of these inorganic additives include the oxides and hydroxides of calcium, magnesium and aluminum, magnesium methoxide, magnesium ethoxide and magnesium hydroxychloride. Treatment temperatures of these inorganic support additives with the dialkyl magnesium solutions can vary from about −65° C. to about 100° C., preferably from about −65° C. to about 65° C. for a period of time from a few minutes to 5 hours. The reaction between the so modified dialkyl magnesium with the alkyl aluminum halide solution is effected at a temperature of from about −65° C. to about 30° C., preferably from about −65° C. to about 0° C.

The titanium halides which are deposited on the magnesium halide supports of this invention are well known, examples thereof being titanium tetrachloride, methoxytitanium trichloride, titanium tetrabromide and titanium tetraiodide. More generally, the titanium halides are characterized by the formula $TiX_n(OR)_{4-n}$, wherein R is a $C_1$-$C_{20}$ alkyl group, X is chlorine, bromine or iodine and n is 1, 2, 3 or 4. Titanium tetrachloride is preferred.

Procedures for depositing a titanium halide on a solid support also are known. However, in accordance with this invention, the titanium halide is added to the magnesium halide support in a controlled, relatively small amount, and there is very little reduction of the tetravalent titanium to trivalent titanium. This is made possible by reason of the substantial removal of residual aluminum compounds from the magnesium halide support by washing of the support with hydrocarbon. Thus, there is little aluminum present to effect reduction of the tetravalent titanium, and the comparatively small amount of tetravalent titanium added to the support actually offers more active sites for polymerization than larger amounts which have had much of the tetravalent titanium reduced to the trivalent state.

The amount of tetravalent titanium halide added to the support in accordance with this invention is such that the amount of titanium does not exceed the amount of magnesium in the support on a molar basis. In actual practice, the magnesium to titanium mole ratio is in the range of from about 200:1 to about 1:1, preferably from about 80:1 to about 5:1. Thus, the overall effect in accordance with this invention is that the amount of titanium in the polymer product is minimal and need not be removed, yet this amount in the catalyst is so highly active that rates and mileages are improved considerably in comparison to previously known catalysts.

In conjunction with depositing the titanium halide on the magnesium halide support, it is desirable to treat the support with an electron donor, more specifically, an alkyl ester of an aromatic acid wherein the ester contains a total of 8 to 24 carbon atoms, such as ethyl benzoate. This particular group of electron donor compounds exhibits the effect of increasing the stereospecificity of the titanium halide in the production of polypropylene. However, excessive amounts of these esters have an adverse effect on the stereospecificity of the titanium catalyst, and the amount of the ester must be controlled in order that the titanium to ester mole ratio lies in the range of from about 0.5:1 to about 10:1, preferably from about 2:1 to about 4:1. Both the ester treatment of the support and the deposition of the titanium halide on the support may be carried out at a temperature of from about 0° to about 100° C., preferably from about 15° to about 40° C., for a period of from about 0.25 hour to about 2 hours.

Optionally, the support, after treatment with the aromatic acid ester and the titanium halide, also may be treated with an electron donor, preferably an aliphatic ether containing four to 24 carbon atoms. The amount of ether used is preferably about the same as that used in the ether treatment following precipitation of the magnesium halide particles in the support preparation, but may be as much as five times greater. The instant ether treatment may be carried out at the same temperatures and for the same times as used in the ester and titanium halide treatments. Finally, the supported catalyst particles are thoroughly washed with fresh hydrocarbon and resuspended in hydrocarbon for use in the polymerization of 1-olefins.

The organometallic compounds of Groups I to III of the periodic table which serve as activator components in the Ziegler-Natta catalysis of 1-olefins are well known. The organoaluminum compounds are preferred, particularly the trialkyl aluminums such as triethyl aluminum, tri-n-propyl aluminum, triisopropyl aluminum, tri-n-butyl aluminum, triisobutyl aluminum and tri-n-hexyl aluminum. These trialkyl aluminums may be used alone, but preferably are partially complexed with an electron donor such as an organic acid ester. Similarly well known are the 1-olefins which may be polymerized using Ziegler-Natta catalysts. Representative of these olefins are ethylene, propylene, 1-butene, 4-methyl-pentene-1 and 1-hexene.

What I claim and desire to protect by Letters Patent is:

1. A process for the preparation of a solid catalyst component for use in the polymerization of 1-olefins, which component is composed of a titanium halide deposited on an essentially anhydrous magnesium halide support, said process comprising the steps, carried out in an inert atmosphere, of (1) dissolving a compound having the formula $R_2Mg$, where R is a $C_2$–$C_{20}$ alkyl group, in a hydrocarbon solvent or a mixture of the hydrocarbon solvent with an electron donor, (2) dissolving a compound having the formula $R'_nAlX_{3-n}$, wherein R' is a $C_1$–$C_{20}$ alkyl group, X is a chlorine or bromine atom and n is 1 or 2, in a hydrocarbon solvent or a mixture of the hydrocarbon solvent with an electron donor, (3) contacting the resulting solutions from steps (1) and (2) with each other at a temperature of from about $-65°$ C. to about $30°$ C. for a period of from about 0.5 to about 5 hours, thereby forming a suspension in the solvent of magnesium halide particles ranging from about 0.05 to about 80 microns in size, (4) isolating said particles from said suspension, (5) successively washing said particles with a hydrocarbon solvent until the particles are substantially free of halide and residual aluminum compounds, (6) contacting said particles with an electron donor before and/or after said particles are successively washed with hydrocarbon solvent, with the proviso that step (6) may be omitted when an electron donor is present in step (1) and/or step (2), (7) washing the donor-treated particles with a hydrocarbon solvent, (8) contacting the washed particles with an alkyl ester of an aromatic acid, wherein the ester contains a total of 8 to 24 carbon atoms, and with a titanium halide, thereby effecting deposition of said titanium halide on the magnesium halide particles, (9) contacting the resulting particles with an electron donor and (10) washing the donor-treated particles with a hydrocarbon solvent, said hydrocarbon solvent being selected from the group consisting of $C_5$–$C_{12}$ aliphatic hydrocarbons, $C_5$–$C_{12}$ monocyclic cycloaliphatic hydrocarbons, $C_6$–$C_{12}$ monocyclic aromatic hydrocarbons and mixtures thereof, and said electron donor being selected from the group consisting of $C_4$–$C_{24}$ aliphatic ethers, $C_3$–$C_4$ cyclic ethers, $C_7$–$C_{15}$ aromatic ethers, $C_4$–$C_{24}$ alkyl esters of fatty acids, $C_8$–$C_{24}$ alkyl esters of aromatic acids, $C_1$–$C_{12}$ aliphatic amines, $C_4$–$C_6$ cyclic amines, $C_6$–$C_{10}$ aromatic amines, $C_1$–$C_{18}$ aliphatic alcohols, $C_7$–$C_{15}$ aromatic alcohols, $C_6$–$C_{10}$ phenols, $C_6$–$C_{18}$ aliphatic or aromatic phosphines and $C_6$–$C_{12}$ aliphatic sulfides.

2. The process of claim 1 wherein the Al/Mg mole ratio in step (3) is from about 1:1 to about 10:1.

3. The process of claim 1 wherein the hydrocarbon is a $C_5$–$C_{12}$ aliphatic hydrocarbon.

4. The process of claim 1 wherein $R_2Mg$ is n-butyl sec-butyl magnesium, n-butyl ethyl magnesium or di-n-butyl magnesium complexed with triethyl aluminum.

5. The process of claim 1 wherein $R'_nAlX_{3-n}$ is ethyl aluminum dichloride.

6. The process of claim 1 wherein the electron donor is a $C_4$–$C_{24}$ aliphatic ether.

7. The process of claim 6 wherein the ether is di-n-butyl ether or diisoamyl ether.

8. The process of claim 6 wherein the ether is present in steps (1) or (2).

9. The process of claim 6 wherein the ether is present in step (6).

10. The process of claim 1 wherein the ester used in step (8) is ethyl benzoate.

* * * * *